United States Patent
Cooke et al.

[11] Patent Number: 5,908,950
[45] Date of Patent: Jun. 1, 1999

[54] POLYETHER MODIFIED FLUOROALKYLSILOXANES

[75] Inventors: Jeffrey A. Cooke, Peekskill; Gerald J. Murphy, Hopewell Junction, both of N.Y.; Yutaka Furukawa, Tokohama; Seisaku Kumai, Fujisawa, both of Japan

[73] Assignee: Witco Corporation, Greenwich, Conn.

[21] Appl. No.: 08/862,939

[22] Filed: May 29, 1997

Related U.S. Application Data

[60] Provisional application No. 60/018,789, May 31, 1996.
[51] Int. Cl.$^6$ .................................................. C07F 7/08
[52] U.S. Cl. ........................ 556/448; 556/445; 252/358
[58] Field of Search .................... 556/445, 448; 252/358

[56] References Cited

U.S. PATENT DOCUMENTS

| | | |
|---|---|---|
| 4,748,225 | 5/1988 | Yoshioka et al. . |
| 4,968,828 | 11/1990 | Yamamoto . |
| 5,047,491 | 9/1991 | Saho et al. . |
| 5,124,467 | 6/1992 | Rodgers et al. .................. 556/448 |
| 5,412,135 | 5/1995 | Fukuda et al. .................. 556/448 |
| 5,446,114 | 8/1995 | O'Lenick, Jr. . |

FOREIGN PATENT DOCUMENTS

| | | |
|---|---|---|
| 0 640 888 A1 | 3/1995 | European Pat. Off. . |
| 0 657 486 A2 | 6/1995 | European Pat. Off. . |
| 0 710 691 A1 | 5/1996 | European Pat. Off. . |
| 07-053719 | 2/1995 | Japan . |

OTHER PUBLICATIONS

Database WPI Derwent Publications Ltd., London, GB; Sep. 6, 1994 abstract.
Database WPI Derwent Publications Ltd., London, GB; Feb. 28, 1995 abstract.

*Primary Examiner*—Paul F. Shaver
*Attorney, Agent, or Firm*—Edward K. Welch, II; Andrew S. Reiskind; Timothy X. Witkowski

[57] ABSTRACT

Polyether modified fluoroalkylsiloxanes having the general structure of Formula (I), Formula (II) or Formula (III):

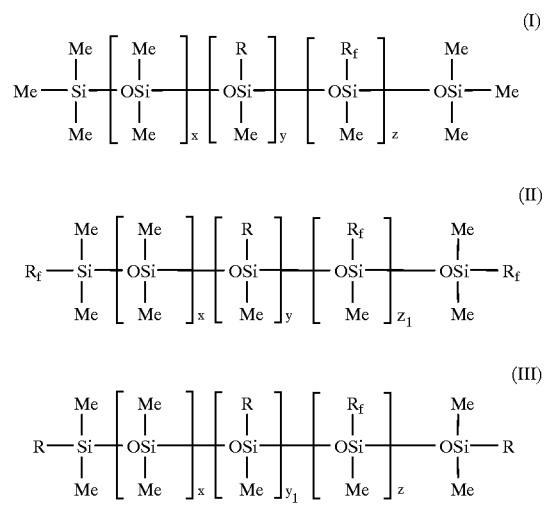

wherein x is about 0 to 500, y is about 1 to 50, z is about 1 to 50, $R=C_pH_{2p}-(OC_2H_4)_n-(OC_3H_6)_m-OR'$ in which p is about 2 to 5, n is about 0 to 50, N is about 0 to 50, and one of n or m must be >0, and R'=H, an alkyl group with 1–4 carbons, or an acetyl group and $R_f=C_aH_{2a}-O_b-C_cH_{2c}-C_dF_{2d+1}$ in which a is 3 or 4, b is 0 or 1, c is 0 or 2–4 and d is 4–12 with the provisos that if b=0, then c=0, and that if b=1, then c=2–4; $z_1$ is about 0 to 50 and $y_1$ is about 0 to 50, are useful to reduce the coefficient of friction and to increase mar resistance of coatings, to increase spreadability and wettability of coating formulations, and as foam control agents.

20 Claims, No Drawings

POLYETHER MODIFIED FLUOROALKYLSILOXANES

This application claims priority from U.S. Provisional application Ser. No. 60/018,789, filed May 31, 1996.

FIELD OF THE INVENTION

The present invention relates to a series of novel silicone terpolymers in which the polydimethylsiloxane backbone is modified with both fluoroalkyl and polyether groups.

While polysiloxanes containing fluoroalkyl modification are known to impart oil and water repellence to surfaces or substances to which they are applied or incorporated, they are in general incompatible with oil or water. By grafting a separate polyether moiety in addition to the fluoroalkyl group onto the backbone of the polysiloxane, one improves the dispersibility and solubility of the compound, providing a material which is much more easily handled, formulated and applied. This invention discloses a novel class of polyether modified fluoroalkylsiloxanes, and provides general methods for their preparation.

BACKGROUND OF THE INVENTION

Fluoroalkyl-substituted siloxanes are known in the art, and have been used to modify the surface characteristics of a substrate, usually providing water and/or oil repellency or lubrication. For example, JP 07-053719, assigned to Shin-Etsu Chem. Co., Ltd., illustrates a process for preparing fluoroalkylsiloxanes by hydrosilation with a corresponding polysiloxane containing $MeSi(H)O_{2/2}$ Units. Yamamoto, et al., (U.S. Pat. No. 4,968,828) demonstrate the preparation of disiloxanes containing both a terminal fluoroalkyl moiety and a terminal SiH moiety, useful as modifiers for improving the surface properties of various materials. Saho, et al., (U.S. Pat. No. 5.047,491) demonstrate a process for the preparation of polysiloxanes which are endcapped with fluoroalkyl and polyether substituents. O'Lenick (U.S. Pat. No. 5,446,114) demonstrates the synthesis of some specific fluorinated dimethicone copolyols which pass water and air but not oil when applied to textiles.

BRIEF SUMMARY OF THE INVENTION

The novel polyether modified fluoroalkylsiloxanes of the present invention have the general structures of Formula (I), Formula (II) and Formula (III):

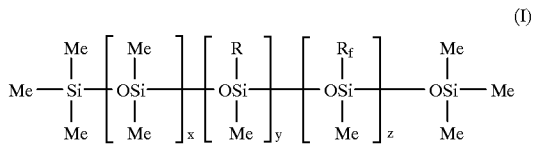

(I)

wherein x is about 0 to 500, y is about 1 to 50, z is about 1 to 50;

each R is $C_pH_{2p}$—$(OC_2H_4)_n$—$C(OC_3H_6)_m$—$OR'$ in which p is about 2 to 5, n is about 0 to 50, m is about 0 to 50, and one or both of n or m must be>0; and each R' is H, an alkyl group with 1–4 carbons, or an acetyl group; and each $R_f$ is $C_aH_{2a}$—$O_b$—$C_{c\ H2c}$—$C_dF_{2d+1}$ in which a is 3 or 4, b is 0 or 1, c is 0 or 2–4 and d is 4–12 with the provisos that if b=0, then c=0, and that if b=1, then c=2–4, and preferably a=3, b 32 0, c=0 and d 32 6–10, or a=3, b=1, c=2 or 3 and d=6 and most preferably a=3, b=0, c=0and d=8, or a=3, b=1, c=2or3 and d=8;

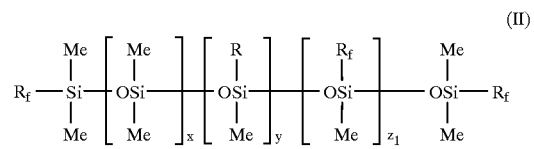

(II)

wherein x, y, R and $R_f$ are as defined previously, and $z_1$ is about 0 to 50;

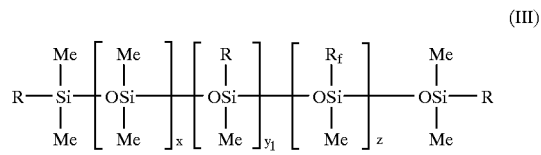

(III)

wherein x, z, R and $R_f$ are as defined previously, and $y_1$ is about 0 to 50.

Another aspect of the present invention is compositions, useful for instance in waterborne solventborne, solventless or powder coatings applications, comprised of about 0.01% by weight to about 50% by weight of one or more polyether modified fluoroalkylsiloxanes of the foregoing formulas (I), (II) and (III) and about 99.99% by weight to about 50% by weight of a suitable curable resinous mixture.

Another aspect of the present invention is a method of enhancing the mar resistance and/or lowering the static and/or kinetic coefficient of friction of a suitable cured coating on a substrate, comprising incorporating a polyether modified fluoroalkylsiloxane of formula (I), (II) or (III) into a curable coating, applying the composition thus formed to a substrate, and curing it on the substrate.

Another aspect of the present invention is a method of increasing the wettability and spreadability of a coating formulation to be applied to a substrate, comprising incorporating a polyether modified fluoroalkylsiloxane of formula (I), (II) or (III) into the formulation.

Another aspect of the present invention is a method of controlling foam, that is, either preventing foam formation or reducing the incidence of foam formation, in a liquid by a liquid about 0.001% to about 10% by weight of the polyether modified fluoroalkylsiloxane to the liquid in which foam is to be eliminated or prevented.

DETAILED DESCRIPTION OF THE INVENTION

Often fluoroalkylsiloxanes are incompatible with oil-based or water-based systems and in addition often do not form stable emulsions or dispersions without the presence of additional surfactants. By the incorporation of a polyether group either onto the backbone or at the terminal of the fluoroalkylsiloxane, as in the compounds of the present invention, one can greatly increase the oil or water repellency, solubility or dispersibility of these derivatives, thus allowing for greater ease in handling, formulating and applying the material.

The polyether modified fluoroalkylsiloxanes, of the present invention are most easily prepared by simultaneously hydrosilating a fluoroalkyl olefin (for example, $CH_2$=$CHCH_2C_8F_{17}$, Asahi Glass Co., Ltd.) and the allyl ether of a polyalkylene glycol (for example, $CH_2$=$CHCH_2O$ $(C_3H_6O)_{2.5}H$, Witco Corporation, OrganoSilicones Group, previously known as OSi Specialties, Inc.) onto a polysiloxane containing Si—H moieties. Hydrosilation reactions are well known in the art, and generally involve heating a mixture of the olefin and Si—H containing polysiloxane in the presence of a hydrosilation catalyst, for example. chloroplatinic acid. For general procedures regarding hydrosilations, one is directed to "Comprehensive Handbook on Hydrosilation", Bogdan Marciniec, Pergamon Press, 1992. Alternatively, the polyether-containing and fluoroalkyl-containing olefins can be hydrosilated sequentially, with either the fluoroalkyl moiety or polyether moiety being added to the backbone of the polysiloxane first.

A third method of preparing these compounds is through equilibration of an appropriate combination of a fluoroalkyl-containing polysiloxane, polyether-containing polysiloxane, and optionally an unmodified polysiloxane. The technique of polysiloxane equilibration is well known in the art. It generally involves mixing the polysiloxanes together with an equilibration catalyst, such as a mineral acid, for a sufficient length of time at or slightly above room temperature, followed by neutralization of the acid. It is also clear that mixtures of more than two different fluoroalkyl-containing polysiloxanes and polyether-containing polysiloxanes could be equilibrated in this manner. The polysiloxanes which would be useful for any of the equilibration reactions could be either linear, or cyclic, or both.

The degree of water and/or oil solubility or dispersibility of the resultant polyether modified fluoroalkylsiloxane can be tailored by both the molecular weight and the type of polyether employed, especially its relative content of ethyleneoxide (EO) and/or propyleneoxide (PO), as well as the extent to which this polyether group is incorporated onto the silicone backbone of the resultant fluoroalkylsiloxane. For example, if one desires water solubility/dispersibility of the fluoroalkylsiloxane, then one would require a relatively large number of water-soluble polyether pendant groups per fluoroalkylsiloxane molecule. An example of such a water-soluble polyether that one could incorporate would be $CH_2=CHCH_2O(C_2H_4O)_4H$ (Witco. OrganoSilicones Group), an allyl polyethylene glycol with a degree of polymerization of about 4. On the other hand, if one wanted to provide compatibility with oil-based systems, then one would use an oil-soluble polyether such as $CH_2=CHCH_2O(C_3H_6O)_{25}.H$ (Witco, OrganoSilicones Group), an allyl polypropylene glycol with a degree of polymerization of about 2.5. The reader will appreciate that other allyl polyalkylene glycols, for example those containing mixed EO/PO, such as $CH_2=CHCH_2O(C_2H_4O)_{13}(C_3H_6O)_{15}H$ (Witco. OrganoSilicones Group), would also starting materials to prepare the polyether modified fluoroalkylsiloxane terpolymers of this invention.

APPLICATIONS

The polyether modified fluoroalkylsiloxanes of the present invention are useful for increasing mar resistance and decreasing the coefficient of friction of coatings, and increasing the spreading and wetting efficacy of coating formulations, when incorporated into a mixture of about 0.01% to about 50% by weight polyether modified fluoroalkylsiloxane in a suitable uncured resinous coating formulation for use in a coating application. The composition displays a marked improvement in these qualities when compared to either coating formulations containing no silicone additive or coatings containing silicones modified by polyether moieties alone. Also, the polyether modified fluoroalkylsiloxanes of the present invention are useful as foam control agents Suitable coating formulations include, but are not limited to, waterborne, solventborne, solventless and powder coatings containing acrylate, acrylated epoxy, polyurethane. Alkyd, or polyester resins. Representative coatings applications include but are not limited to radiation cured overprint varnishes; solventborne, waterborne and solventless wood coatings; paint, ink, and pigment applications; and other examples which involve the application of a functional coating to a substrate.

Radiation cured solventless coating formulations in general can be divided into two groups by their method of cure, namely free radical or cationic polymerization. Polyether modified fluoroalkylsiloxanes would be expected to exhibit efficacy in either formulation type.

Such formulations suitable for free radical curing include but are not limited to mixtures of urethane acrylate and/or acrylated epoxide resins (for example Ebecryl® 745, Ebecryl® 4849, and Ebecryl® 880 (UCB Chemical Corporation)) monofunctional and/or multifunctional acrylates (for example trimethylol propane triacrylate, tetraethylene glycol diacrylate, and 1, 6 hexanediol diacrylate (Aldrich Chemical Co.)), nonreactive and/or reactive additives (for example foam control agents such as Sag® 47, Sag® 1000, and CoatOSil®(g 1378 (Witco Corp)), and photoinitiators (for example Irgacure® 184, Irgacure® 500, and Darocur® 4265 (Ciba Geigy Corp.); Cyracure® UVI-6974 and Cyracure® 6990 (Union Carbide Corp.)).

Such formulations suitable for curing by cationic polymerization include but are not limited to mixtures of a cycloaliphatic epoxides (for example Cyracure® UVR-6100, Cyracure® UVR-635 1 (Union Carbide Corp.); Degacure® K 126 (Degussa A. G.); Celoxide® 2000 (Daicel Chemical Ind.). Photoinitiators (for example Cyracure® UVI-6974, Cyracure® UVI-6990 (Union Carbide Corp.); Degacure® KI-85 (Degussa A. G.); UVE-1014, UVE-1016 (General Electric Co.)), and reactive or non-reactive additives (for example foam control agents such as Sag® 47, Sag® 1000, and CoatOSil® 1378 (Witco Corp)),

EXAMPLES

In the following examples, R=specified polyether and $R_f$=specified fluoroalkyl moiety.

Example 1

Simultaneous Hydrosilation of $CH_2=CHCH_2C_8F_{17}$ and $CH_2=CHCH_2O(C_3H_6O)_{2.5}H$ with $Me_3Si(OSiMC_2)_{45}$ $(OSiMeH)_5OSiMe_5$ A nitrogen flushed, 250 mL round bottom flask equipped with a heating mantle, thermometer, mechanical stirrer, condenser topped with a nitrogen inlet, and two addition funnels, was charged with 3.0 g (0.0065 mol, 6.5 meqs) $CH_2=CHCH_2C_8F_{17}$, 2.0 g (0.096 mol, 9.6 meqs) $CH_2=CHCH_2O(C_3H_6O)_{2.5}H$, 100 g (0.0263 mmol. 132 meq) of an equilibrated Si—H fluid with nominal formula, $Me_3Si(OSiMe_2)_{45}(OSiMeH)_5,OSiMe_3$, and toluene (60 mL). The mixture was stirred and heated to 85° C., at which time 1% chloroplatinic acid solution in isopropanol (0.20 mL, ~10 ppm) was added via syringe. The temperature of the solution rose to 91° C. over a period of three minutes. After the initial exotherm subsided, additional aliquots of allyl polyether (15.7 g, 0.0755 mol, 75.5 meq. 30% excess) and fluoroolefin (27.2 g, 0.059 mol, 59 meq, 0% excess) were added dropwise and simultaneously from two addition funnels, over a period of 15 minutes. The temperature at this point was maintained between 90° C. and 94° C. Following the addition, the temperature of the reaction mixture was maintained at 95° C. for an additional 30 minutes. Analysis indicated no residual Si—H content. The reaction mixture was cooled to 70° C. neutralized with NaHCO$_3$ (10 g), and stirred for 1 hour at this temperature. The suspension was filtered and stripped of the toluene solvent (rotary evaporator, 70° C., 1 mm Hg) to yield a clear, light brown, viscous liquid, identified as the expected polyether modified fluoroalkylsiloxane Me$_3$Si(OSiMe$_2$)$_{45}$(OSiMeR$_f$)$_{2.5}$ (OSiMeR)$_{2.5}$OSiMe$_3$.

Example 2

Sequential hydrosilation of CH$_2$=CHCH$_2$C$_8$F$_{17}$ and CH$_2$=CHCH$_2$O(C$_2$H$_4$O)$_4$H with Me$_3$Si(OSiMc$_2$)$_{80}$ (OSiMcH)$_{20}$OSiMe$_3$ A nitrogen flushed, IL round bottom flask equipped with a heating mantle, thermometer, mechanical stirrer, and condenser topped with a nitrogen inlet, was charged with 150.0 g (0.0206 mol, 411 meq), of an equilibrated Si—H fluid with the nominal formula, Me$_3$Si(OSiMe$_2$)$_{(OSiMeH)20}$OSiMe$_3$, 99.3 g (0.216 mol, 216 meq) C$_3$H$_5$C$_8$F$_{17}$ and toluene (200 g). The mixture was stirred and heated to 85° C., at which time 1% chloroplatinic acid solution in isopropanol (0.21 mL, ~5 ppm) was added via syringe. The temperature of the solution rose to 106° C. over a period of three minutes. After the initial exotherm subsided, the temperature was maintained at 95° C. for a period of one hour. The reaction mixture was cooled to 70° C., neutralized with NaHCO$_3$ (20 g), and stirred for an additional 1 hour at this temperature. The resulting suspension was filtered and stripped of the toluene solvent (rotary evaporator, 70° C., 1 mm Hg) to yield clear, colorless, viscous liquid, identified as the expected methyl-hydrogen modified fluoroalkylsiloxane, Mc$_3$Si (OSiMc$_2$)$_{80}$(OSiMcH)$_{10}$(OSiMcR$_f$)$_{10}$OSiMe$_3$.

In a subsequent step, 50.0 g (0.0042 mol, 42 moq) of this same methyl-hydrogen modified fluoroalkylsiloxane, 12.74 g (0.0547 mol, 54.7 meq, 30% excess) of an allyl polyethylene glycol, CH$_2$=CHCH$_2$O(C$_2$H$_4$O)$_4$H. and toluene (50 g) were charged to a nitrogen flushed 250 mL round bottom flask equipped with a heating mantle, condenser, thermometer, mechanical stirrer and nitrogen inlet. The mixture was stirred and heated to 85° C., at which time 1% chloroplatinic acid solution in isopropanol (0.1 mL, ~10 ppm) was added via syringe. The temperature rose to 90° C. over a period of three minutes. After the initial exotherm subsided, the temperature of the reaction was raised to 95° C. and held there for a period of one hour. Analysis of the reaction mixture indicated the presence of unreacted Si—H. Over the next three hours at 95° C., the reaction had to be recatalyzed three times (total catalyst. 0.4 mL, ~40 ppm). before analysis indicated complete consumption of Si—H. The reaction mixture was cooled to 70° C., neutralized with NaHCO$_3$ (5 g), and stirred for 1 hour. The resulting suspension was filtered and stripped of the toluene solvent (rotary evaporator, 70° C., 1 mm Hg) to yield clear, light brown viscous liquid, which was identified as the expected polyether modified fluoroalkylsiloxane Me$_3$Si(OsiMe$_2$)$_{80}$ (OSiMeR$_f$)$_{10}$(OSiMeR)$_{10}$OSiMe$_3$.

Example 3

Sequential Hydrosilation of CH$_2$=CH$_2$CHC8F$_{17}$ and CH$_2$=CH$_2$CHO(C$_2$H$_4$O)$_{13}$(C$_3$H$_6$O)$_{15}$H with Me$_3$Si(OSiMe$_2$)$_{22}$ (OSiMeH)$_{22}$OSiMe$_3$ A nitrogen flushed, IL round bottom flask equipped with a heating mantle, thermometer, mechanical stirrer, and condenser topped with a nitrogen inlet, was charged with 75 g (0.0241 niol, 530 meq), of an equilibrated Si—H fluid with the nominal formula Me$_3$Si(OSiMe$_2$)$_{22}$(OSiMeH)$_{22}$OSiMe$_3$, 25.59 g (0.0556 mol, 55.6 meq) CH$_2$=CH$_2$CHC$_8$F$_{17}$ 0.72 g sodium propionate (~0% w/w based on final charge). The mixture was stirred and heated to 85° C., at which time 1% chloroplatinic acid solution in isopropanol (0.72 mL, ~10 ppm based on final charge) was added via syringe. The temperature of the solution rose to 122° C. over a period of 1 minute, and was cooled with an air stream. After the initial exotherm subsided, the temperature of the reaction was adjusted to 90° C. and an additional aliquot of the fluoroolefin (102.37 g, 0.222 mol, 222 meq) was added over a period of about one half hour. The temperature at this point was maintained between 90° C. and 95° C. Following completion of the addition of the fluoroolefin, CH$_2$=CH$_2$CHO(C$_2$H$_4$O)$_{13}$(C$_3$H$_6$O)$_{15}$H (516.45 g, 0.344 mol 344 meq,~30% excess) was added dropwise from addition funnel over a period of 1.5 hours. As the polyether was added, the reaction mixture became more viscous and milky white in color. The hydrosilation of the allyl polyether appeared to be occurring extremely slowly, and the reaction was recatalyzed three more times, over a period of approximately four hours, with a total of approximately 2.1 mL of 1% chloroplatinic acid in isopropanol to give a final concentration of about 35 ppm. During this time the reaction mixture slowly changed in appearance from a thick white suspension to a viscous. light brown clear liquid. Subsequent analysis indicated absence of residual Si—H content. The temperature was adjusted to 75° C., NaHCO$_3$ (50 g) was added, and the mixture stirred 1 hour. The reaction mixture was filtered yielding a clear, light brown, very viscous liquid.

Example 4

Formation of R$_f$Me$_2$SiOSiMe$_2$)$_{10}$(OSiMeR)$_5$OsiMe$_2$R$_f$

A nitrogen flushed, 2L round bottom flask equipped with a heating mantle, thermometer, mechanical stirrer, and condenser topped with a nitrogen inlet was charged with 300 g (0.343 mol, 696 meq) of an equilibrated Si—H fluid with the nominal formula HMe$_2$Si(OSiMe$_2$)$_{10}$OSiMe$_2$H and 331 g (0.719 mol, 719 meq) CH$_2$=CH$_2$CHC$_9$F$_{17}$. The mixture was stirred and heated to 83° C., at which time 1% chloroplatinic acid solution in isopropanol (0.50 mL. ~10 ppm) was added via syringe, the heating mantle removed, and an ice bath placed under the mixture. The temperature of the solution rose to 138° C. over a period of three minutes. After the initial exotherm subsided, the temperature of the reaction was maintained at 95° C. for a period of one hour. The reaction was cooled to 70° C., and NaHCO$_3$ (20 g) was added, and the suspension stirred for 1 hour at this temperature. The reaction mixture was filtered and stripped of volatile components (rotary evaporator, 70° C., 1 mm Hg) to yield clear, colorless, viscous liquid, identified as the expected fluoroalkylsiloxane, R$_f$Me$_2$Si(OSiMe$_2$)$_{10}$OSiMe$_2$R$_f$.

In a second step, a nitrogen flushed 250 mL round bottom flask equipped with a thermometer, mechanical stirrer and condenser was charged with 100 g (0.0557 mol) of the same fluoroalkylsiloxane R$_f$Me$_2$Si(OSiMe$_2$)$_{10}$OSiMe$_2$R$_f$. 16.73 g (0.0696 mol) of the cyclic siloxane (OSiMeH)$_4$ and concentrated H$_2$SO$_4$ (3.5 g). The mixture was stirred for 18 hours at room temperature. NaHCO$_3$ (20 g) was added, and the suspension stirred for 5 hours at room temperature. The reaction mixture was filtered yielding a clear, colorless, slightly viscous liquid identified as the expected methyl-hydrogen modified fluoroalkylsiloxane R$_f$Me$_2$Si(OSiMe$_2$)$_{10}$ (OSiMeH)$_5$OSiMe$_2$R$_f$.

In a third step, a nitrogen flushed 250 mL round bottom flask equipped with a heating mantle, thermometer, mechanical stirrer, and condenser topped with a nitrogen inlet was charged with 30.0 g (0.0143 mol, 71.5 meq) of the same methyl-hydrogen modified fluorosiloxane R$_f$Me$_2$Si (OSiMe$_2$)$_{10}$(OSiMeH)$_5$OSiMe$_2$R$_1$ and 21.6 g (0.0930 mol, 93 meq) CH$_2$=CHCH$_2$O(C$_2$H$_4$O)$_4$H. The mixture was stirred and heated to 80° C., at which time 1% chloroplatinic acid solution in isopropanol (0.05 mL, ~10 ppm) was added via syringe. No initial exotherm was noted. The temperature of the reaction mixture was raised to 95° C., and the mixture was recatalyzed with an additional aliquot of chiloroplatinic acid (0.05 mL). The temperature of the solution rose to a temperature of 103° C. over a period of one minute. When the initial exotherm subsided, the temperature was adjusted to 95° C. and the mixture stirred 1.5 h, at which time analysis indicated residual Si—H content. Chloroplatinic acid (0.05 mL) was added, and the mixture stirred an additional 1 h. At this point no residual Si—H was detected. The reaction was cooled to 70° C., and NaHCO$_3$ (5 g) was added, and the suspension stirred for 1 hour at this temperature. The reaction mixture was filtered and stripped of any volatile components (rotary evaporator, 70° C., 1 mm Hg) to yield clear, colorless, viscous liquid, identified as a mixture of the expected polyether modified fluoroalkylsiloxane R$_f$Me$_2$Si (OSiMe$_2$)$_{10}$(OSiMeR)$_5$OSiMe$_2$R$_1$, and unreacted allyl polyether.

Example 5
Coefficient of Friction (COF) Measurements of an Acrylate Radiation Cure Formulation Containing Either Silwete® L-7604 surfactant or a Polyether Modified Fluoroalkylsiloxane (IFS):

Panels of a standard acrylate-functional radiation cure overprint varnish formulation (Sun Chemical Corp.) were prepared using a #3 wire wound rod (Byk-Gardner Inc.) to draw down the formulation onto Leneta opacity charts (Byk-Gardiner Inc.) and cured by irradiation with 100 mJ/cm UV radiation on a laboratory UV cure apparatus (UV Systems Inc.). In addition, panels were prepared with acrylate formulation containing one of 1.0% Silwet® L-7604 Surfactant ((CH$_3$)$_3$SiO(Si(CH$_3$)$_2$O)$_{15}$D"$_{5.5}$Si(CH$_3$)$_3$ where D" is OSi(CH$_3$)R (Witco Corp.), 0.1% Me$_3$Si(OSiMe$_2$)$_{15}$(OSiMeR)$_{5.5}$(OSiMeR$_f$)OSiMe$_3$ and 1.0% Me$_3$Si(OSiMe$_2$)$_{15}$(OSiMeR)$_{5.5}$(OSiMeR$_f$)OSiMe$_3$ where R=(CH$_2$)$_3$(OC$_2$H$_4$)$_{7.5}$OH and R$_1$=(CH$_2$)$_3$C$_8$F$_{17}$. Kinetic COF was measured on the panels using a Monitor/Slip & Friction apparatus (TMI Inc.). The results of the measurements are shown in Table 1 and FIG. 1:

TABLE 1

| Additive to Overprint Varnish | Average COF |
| --- | --- |
| None | 0.90 |
| 1.0% L-7604 | 0.41 |
| 0.1% PFS | 0.44 |
| 1.0% PFS | 0.24 |

It is readily apparent that the addition of even 0.1% of the PFS is effective at markedly lowering the COF of an overprint varnish formulation, when compared with the COF of the control formulation and the control formulation containing 1.0% by weight of a standard polyether modified silicone surfactant (Silwet® L-7604 surfactant).

Example 6
Coefficient of Friction (COF) Measurements of an Acrylate Radiation Cure Formulation Containing Varying Amounts of Silwet® L-7604 surfactant or a Polyether Modified Fluoroalkylsiloxane (PFS).

Panels of a standard acrylate-functional radiation cure overprint varnish containing varying amounts (given in weight %) of either or both Silwet® L-7604 surfactant and Me$_3$Si(OSiMe$_2$)$_{15}$(OSiMeR)$_{55}$(OSiMeR$_f$)OSiMe$_3$ where R=(CH$_2$)$_3$(OC$_2$H$_4$)$_{7.5}$OH and R$_1$=(CH$_2$)$_3$C$_8$F$_{17}$ (PFS) were prepared, and the COF measured as shown in Table 2 and FIG. 2:

TABLE 2

| Panel | % L-7604 | % PFS | COF |
| --- | --- | --- | --- |
| A | 1.0 | 0 | 0.39 |
| B | 0.9 | 0.1 | 0.30 |
| C | 0.5 | 0.5 | 0.18 |
| D | 0 | 1.0 | 0.17 |

It is clear from the data that small amounts of PFS can markedly decrease the COF of all overprint varnish formulation, when used alone or in conjunction with a standard polyether modified silicone (Silwet® L-7604 surfactant).

What is claimed is:

1. A polyether modified fluoroalkylsiloxane having the general structure of Formula (I), Formula (II) or Formula (III):

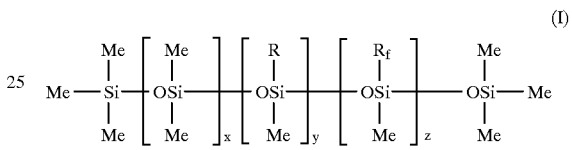

wherein x is about 0 to 500, y is about 1 to 50, z is about 1 to 50, R=C$_p$H$_{2p}$—(OC$_2$H$_4$)$_n$—(OC$_3$H$_6$)$_m$—OR' in which p is about 2 to 5, n is about 0 to 50, m is about 0 to 50, and one of n or m must be >0, and R'=H, an alkyl group with 1–4 carbons, or an acetyl group and R$_f$=C$_a$H$_{2a}$—O$_b$—C$_c$H$_{2c}$—C$_d$F$_{2d+1}$ in which a is 3 or 4, b is 0 or 1, c is 0 or 2–4 and d is 4–12 with the provisos that if b=0, then c=0, and that if b=1, then c 2–4;

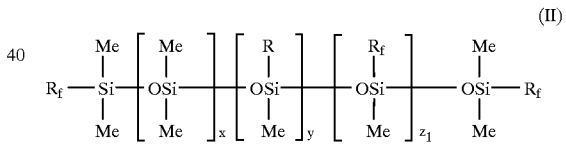

wherein x, y, R and R$_f$ are as defined previously, and z$_1$ is about 0 to 50;

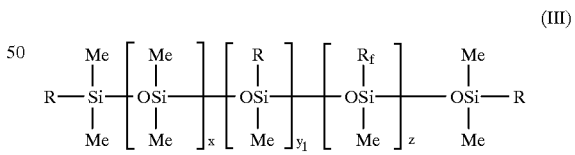

wherein x, z, R and R$_f$ are as defined previously, and y$_1$ is about 0 to 50.

2. A polyether modified fluoroalkylsiloxane according to claim 1 having the structure of Formula (I).

3. A polyether modified fluoroalkylsiloxane according to claim 2 wherein a=3, b=0, c=0 and d=6–10.

4. A polyether modified fluoroalkylsiloxane according to claim 2 wherein a=3, b=1, c=2 or 3 and d=6.

5. A polyether modified fluoroalkylsiloxane according to claim 2 wherein a=3, b=0, c=0 and d=8.

6. A polyether modified fluoroalkylsiloxane according to claim 2 wherein a=3, b=1, c=2 or 3 and d=8.

7. A polyether modified fluoroalkylsiloxane according to claim 1 having the structure of Formula (II).

8. A polyether modified fluoroalkylsiloxane according to claim 7 wherein a=3, b=0, c=0 and d=6–10.

9. A polyether modified fluoroalkylsiloxane according to claim 7 wherein a=3, b=1, c=2 or 3 and d=6.

10. A polyether modified fluoroalkylsiloxane according to claim 7 wherein a=3, b=0, c=0 and d=8.

11. A polyether modified fluoroalkylsiloxane according to claim 7 wherein a=3, b=1, c=2 or 3and d=8.

12. A polyether modified fluoroalkylsiloxane according to claim 1 having the structure of Formula (III).

13. A polyether modified fluoroalkylsiloxane according to claim 12 wherein a=3, b=0, c=0 and d=6–10.

14. A polyether modified fluoroalkylsiloxane according to claim 12 wherein a=3, b=1, c=2or 3and d=6.

15. A polyether modified fluoroalkylsiloxane according to claim 12 wherein a=3, b=0, c=0 and d=8.

16. A polyether modified fluoroalkylsiloxane according to claim 12 wherein a=3, b=1, c=2 or 3and d=8.

17. A composition of matter comprising 50% to 99.99% by weight of a composition curable into a coat and 0.01% to 50% by weight of a polyether modified fluoroalkylsiloxane according to claim 1.

18. A method of increasing the mar resistance of a coating formed by curing a curable composition on a substrate, comprising adding to the curable composition a polyether modified fluoroalkylsiloxane according to claim 1 in an amount comprising 0.01% to 50% by weight of the composition, applying the composition to a substrate, and curing the composition.

19. A method of increasing the wettability and spreadability of a composition curable into a coating on a substrate, comprising adding to the composition a polyether modified fluoroalkylsiloxane according to claim 1 in an amount comprising 0.01% to 50% by weight of the composition.

20. A method of eliminating or reducing the tendency to foam of a liquid, comprising adding to the liquid a polyether modified fluoroalkylsiloxane according to claim 1 in an amount comprising 0.001% to 10% by weight of the liquid.

* * * * *